United States Patent [19]

Campbell

[11] 3,843,216
[45] Oct. 22, 1974

[54] CYLINDRICAL BEARING ASSEMBLY

[75] Inventor: Trevor G. Campbell, Peoria, Ill.

[73] Assignee: Caterpillar Tractor Co., Peoria, Ill.

[22] Filed: Dec. 11, 1972

[21] Appl. No.: 314,148

[52] U.S. Cl. ............................................ 308/36.1
[51] Int. Cl. ......................................... F16c 33/74
[58] Field of Search ....................... 308/36.1, 238

[56] References Cited
UNITED STATES PATENTS

| | | | |
|---|---|---|---|
| 2,626,839 | 1/1953 | Creson et al. | 308/36.1 |
| 2,906,562 | 9/1969 | Burgman | 308/36.1 |
| 3,220,756 | 11/1965 | Templeton | 308/36.1 |
| 3,441,288 | 4/1969 | Boughner | 308/36.1 |
| 3,492,055 | 1/1970 | Frankland | 308/36.1 |
| 3,582,166 | 6/1971 | Reising | 308/238 |

*Primary Examiner*—Manuel A. Antonakas
*Assistant Examiner*—Barry Grossman
*Attorney, Agent, or Firm*—Phillips, Moore, Weissenberger Lempio & Strabala

[57] ABSTRACT

A cylindrical bearing assembly including a cylindrical bearing sleeve and a rigid cylindrical bearing support member which encircles and supports the bearing sleeve, a pair of seals for sealing the bearing surface of the bearing sleeve, and a pair of retaining grooves and flanges formed in the rigid cylindrical bearing support member for retaining the bearing sleeve and seals therein.

12 Claims, 3 Drawing Figures

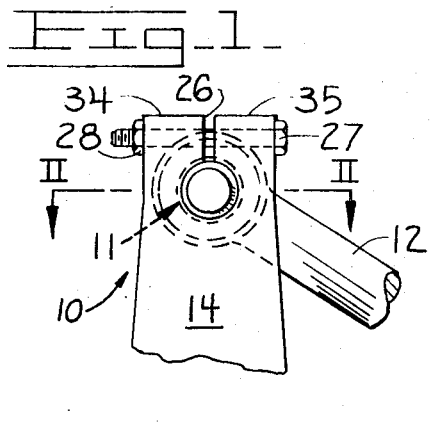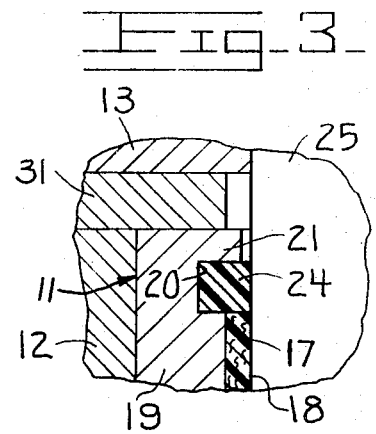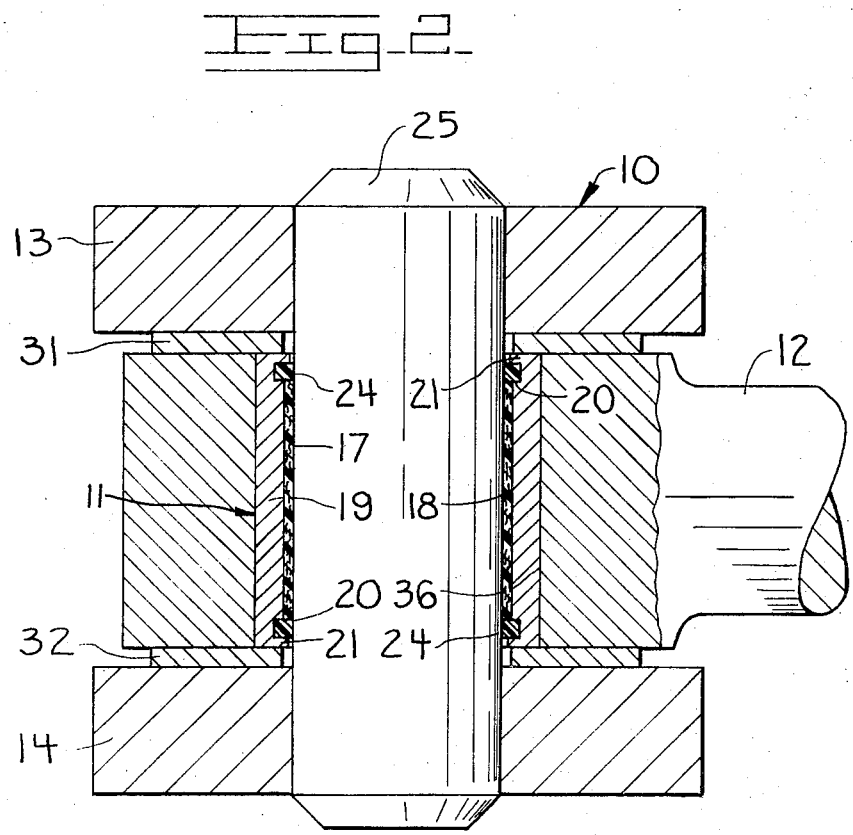

CYLINDRICAL BEARING ASSEMBLY

BACKGROUND OF THE INVENTION

Cylindrical bearing assemblies are found in many types of machines and vehicles where provision is necessary for relative movement between two or more elements. A typical application for a cylindrical bearing assembly would be in the pivot connection of the loader linkage of a material loading machine. Such bearing assemblies usually require an oil type lubrication system due to the relative motion under load between the bearing and the moving parts. Necessary lubrication can be supplied by an external lubrication source, an internal grease reservoir, or in some cases, an oil impregnated metal alloy member which forms a portion of the bearing assembly.

When an external lubrication source is utilized, it is necessary to provide fittings and transport lines to the bearing assembly. Oil seals are required to retain the lubricant within the bearing assembly. These elements add considerably to the complexity and cost of the bearing assembly construction. Furthermore, if the lubricant supply is interrupted inadvertently, damage to the bearing and related components could result.

In any lubrication system, cleanliness of the lubricant is very important to prevent damage to the lubricated parts. Therefore, with bearing assemblies having auxiliary external lubricating systems, filtration of the oil or other lubricant supply, or other anti-contamination measures are necessary.

When a grease reservoir type lubrication system is used, it is necessary to provide grease fittings into the bearing area as well as a reservoir of some sort. Additionally, regular maintenance is generally required to keep the grease reservoir full.

SUMMARY OF THE INVENTION

The present invention provides an improved cylindrical bearing assembly having a readily replaceable non-metallic woven fiber polytetrafluoroethylene bearing sleeve which is self-lubricating. The invention also provides seals designed to keep foreign matter away from the bearing surfaces and further provides a support member having retaining grooves and flanges therein for retaining the bearing sleeve and seals.

The objects and advantages of the present invention will become readily apparent upon reference to the accompanying drawing and following description.

BRIEF DESCRIPTION OF THE DRAWING

FIG. 1 is a plan view of a portion of a pivot joint incorporating the cylindrical bearing assembly of the present invention;

FIG. 2 is an enlarged horizontal cross sectional view of the pivot joint and cylindrical bearing assembly taken along the line II—II of FIG. 1; and FIG. 3 is an enlarged horizontal cross sectional view of a portion of the bearing assembly of FIG. 2 showing details of the seal, retaining flange, and a retaining groove.

DETAILED DESCRIPTION

With particular reference to FIG. 1 in the drawing, a portion of a pivot joint, generally designated by the reference numeral 10, incorporating a cylindrical bearing assembly 11 of the present invention is shown. The pivot joint includes an arm member 12, two stationary structural members 13 and 14 and the instant bearing assembly. The pivot joint and bearing assembly are shown in greater detail in FIG. 2.

The cylindrical bearing assembly 11 includes a cylindrical bearing sleeve 17 which has an internal bearing surface 18. In the preferred embodiment, the bearing surface of the bearing sleeve is preferably composed of woven polytetrafluoroethylene fibers (Teflon) which provides a low friction self-lubricating bearing surface. However, other materials having high load bearing characteristics and selflubricating properties such as molybdenum disulphide, impregnated graphite and the like could be utilized.

The bearing assembly further includes a rigid cylindrical bearing support member 19 which encircles and supports the bearing sleeve. The support member is preferably composed of steel, steel alloy materials or the like which provide sufficient strength to allow the bearing sleeve to support heavy loads. A pair of annular grooves 20 are machined or formed in the member 19 and radially inwardly extending flanges or lips 21 are provided at the opposite axially spaced ends of the support member. A seal member 24 is retained within and by each groove and flange to effectively seal the bearing surface 18 from foreign material.

In the preferred embodiment, the entire cylindrical bearing assembly 11 is retained non-rotationally within the arm member 12. A pin member 25 transpierces the bearing assembly and is retained within two stationary structural members 13 and 14. Each of the structural members is firmly clamped about the pin member 25 by means of bifurcations 34 and 35 which straddle a slot 26, a bolt 27, and nut fastening means 28. One of these clamping arrangements is shown in FIG. 1. The pin member is preferably hardened and ground or is plated with a hard wear resistant material such as chromium.

In the preferred embodiment, the arm member 12 is placed directly between the structural members 13 and 14 and is retained in this central position by thrust washer means 31 and 32. In the orientation, the bearing assembly 11, housed within the arm member 12, is capable of rotational or oscillatory motion with respect to the pin member 25.

The detailed constructions of the annular groove 20, the flange 21, and seal member 24 can be seen with particular reference to FIG. 3. The seal member 24, when in place, prevents contamination of the internal bearing surface 18. The flange 21, on the other hand, protects the seal member and retains it within the annular groove.

The cylindrical bearing assembly 11 may be conveniently preassembled for mounting in or upon an auxiliary mechanism such as the arm member 12. This is accomplished by first inserting the bearing sleeve 17 into the cylindrical support member 19. To facilitate such insertion and also the removal of the bearing sleeve from the support member, a longitudinally extending slot (not shown) may be provided in the bearing sleeve extending the length thereof. After placement of the bearing sleeve, the seal members 24, rubber rings or the like, are snapped into place within each of the grooves 20. This essentially completes the bearing assembly.

The entire bearing assembly 11 is then secured within the arm member 12 in a convenient manner. In the embodiment shown, the bearing assembly is preferably press fitted within a closely fitting bore 36 in the arm member 12. With the bearing assembly properly secured within the arm member, the arm member is then placed between the two structural members 13 and 14 and the thrust washers 31 and 32 are properly positioned. The pin member 25 is then inserted through member 13, through the bearing sleeve 17, and then through the structural member 14. With the pin member in place, the nuts 28 are tightened onto the bolts 27 to thereby secure the structural members 13 and 14 to the pin member 25. The pin member 25 is thus rigidly secured between the stationary structural members 13 and 14. The arm member 12 is free to rotate or oscillate relative to the pin member 25. As previously mentioned, no auxiliary lubrication is necessary inasmuch as the bearing surface 18 is self-lubricating and the assembly is essentially a sealed unit.

If damage or wear necessitates a renewed bearing surface, the bearing sleeve 17 can be easily and inexpensively replaced. Furthermore, the entire bearing assembly 11 can be readily replaced if necessary. These measures obviate the necessity to replace the relatively expensive arm member 12.

In view of the foregoing, it is readily apparent that the structure of the present invention provides an improved cylindrical bearing assembly which is self-lubricating, easily replaceable, and relatively free of contaminating substances in the bearing area.

While the invention has been described and shown with particular reference to the preferred embodiment, it will be apparent that variations are possible which would fall within the spirit of the present invention, which invention is not intended to be limited, except by the scope of the appended claims.

In the claims:

1. In combination a first member, a second member, and a cylindrical bearing assembly, said assembly comprising: a cylindrical bearing sleeve member having an integral bearing surface thereon and having axially spaced opposite end portions, bearing support means mounted within said first member for retaining and rigidly supporting said unitary bearing sleeve member, said cylindrical bearing sleeve member being coaxial with and mounted within said bearing support means and said bearing support means extending axially beyond said axially-spaced opposite end portions of said cylindrical bearing sleeve member, seal means mounted upon said bearing support means and located proximate said axially spaced opposite end portions upon said protions of said bearing support means which extend axially beyond said opposite end portions of said bearing sleeve member for sealing said bearing surface against debris, and retaining means formed by said bearing support means for retaining said bearing sleeve member and for retaining said seal means within said bearing support means and for limiting axial movement of said bearing sleeve member and said seal means.

2. The cylindrical bearing assembly of claim 1 wherein said cylindrical bearing sleeve member is comprised at least partially of non-metallic self-lubricating material.

3. The cylindrical bearing assembly of claim 2 wherein said cylindrical bearing sleeve member is comprised at least partially of woven polytetrafluoroethylene fibers.

4. The cylindrical bearing assembly of claim 3 wherein said cylindrical bearing support means are fabricated from a rigid metallic material.

5. The cylindrical bearing assembly of claim 4 wherein said seal means include a pair of annular rubber seal rings.

6. The cylindrical bearing assembly of claim 4 wherein said seal means include a pair of annular resilient plastic material seal rings.

7. The cylindrical bearing assembly of claim 1 wherein said retaining means include a pair of radially inwardly extending flanges and an annular groove adjacent each flange and wherein one of each groove and adjacent flange set is located adjacent each said opposite end portion.

8. In combination, a first member, a second member, and a cylindrical bearing assembly for permitting relative rotary motion between such members comprising a cylindrical unitary bearing sleeve member having an internal integral bearing surface thereupon and having axially spaced opposite end portions, a cylindrical bearing support member coaxial with and in supporting relation to said bearing sleeve member and extending axially beyond said spaced opposite end portions, said bearing support member being mounted non-rotationally within said first member, said second member transpiercing said cylindrical bearing sleeve member, seal means mounted within said bearing support member and located proximate said opposite end portions of said bearing sleeve member for sealing said bearing surface against debris, and retaining means forming a portion of said bearing support member in said portions thereof extending axially beyond said spaced opposite end portions for holding said sleeve member and said seal means within said support member and for limiting axial movement of said sleeve member and said seal means.

9. The cylindrical bearing assembly of claim 8 wherein said sleeve member and said internal bearing surface is comprised of a nonmetallic self-lubricating material.

10. The cylindrical bearing assembly of claim 9 wherein said non-metallic self-lubricating material is at least partially woven fibers of polytetrafluoroethylene.

11. The cylindrical bearing assembly of claim 10 wherein said seal means comprises a pair of annular rubber seal rings.

12. The cylindrical bearing assembly of claim 11 wherein said retaining means include a pair of axially spaced radially inwardly extending flanges and seal means retaining annular groove adjacent to each flange.

* * * * *